United States Patent [19]
Norton

[11] Patent Number: 4,543,541
[45] Date of Patent: Sep. 24, 1985

[54] FSK MODULATION USING SWITCHED OUTPUTS OF TWO OSCILLATORS

[75] Inventor: Jerry J. Norton, Bartlesville, Okla.

[73] Assignee: Phillips Petroleum Company, Bartlesville, Okla.

[21] Appl. No.: 600,755

[22] Filed: Apr. 16, 1984

[51] Int. Cl.[4] .......................................... H04L 27/12
[52] U.S. Cl. .................................. 332/16 R; 331/25; 331/49; 331/116 R; 375/66; 332/19
[58] Field of Search ..................... 332/16 R, 19, 16 T; 375/66, 45; 331/49

[56] References Cited

U.S. PATENT DOCUMENTS

| | | | |
|---|---|---|---|
| 2,491,387 | 12/1949 | Miller . | |
| 2,494,321 | 1/1950 | Usselman | 375/66 |
| 2,568,408 | 9/1951 | Peterson . | |
| 2,866,161 | 12/1958 | Davidoff | 332/19 |
| 2,927,159 | 3/1960 | Bannister et al. . | |
| 3,032,611 | 5/1962 | Montgomery . | |
| 3,899,746 | 8/1975 | Gammel | 331/2 |
| 4,105,948 | 8/1978 | Wolkstein | 331/14 |

Primary Examiner—Siegfried H. Grimm
Attorney, Agent, or Firm—French and Doescher

[57] ABSTRACT

Two oscillators are utilized to convert digital data into an FSK modulated signal. One oscillator is at the mark frequency and the other is at the space frequency. FSK modulation is accomplished by switching between the two frequencies based on the state of the digital data. Phase and frequency shifting techniques are also provided to insure that a desired difference between the mark frequency and space frequency is maintained and to also insure that a proper phase relationship is maintained between the output from the two oscillators.

8 Claims, 4 Drawing Figures

FSK MODULATION USING SWITCHED OUTPUTS OF TWO OSCILLATORS

This invention relates to the transmission of digital data by frequency shift keying (FSK).

FSK refers to a modulation technique utilized to transmit digital data. Typically, a "0" or "space" is transmitted as one frequency and a "1" or "mark" is transmitted as a second frequency. The name of the modulation technique is derived from the fact that a shifting occurs between the two freqencies when the state of the digital data changes. FSK modulation is utilized in many communication applications.

As with any communication technique, high stability for the 0 and 1 frequencies is desired. Crystal oscillators are generally utilized to obtain high stability but crystals have a narrow band width. Because of this, the frequency cannot be changed rapidly which is required for high data rates. Also, large changes in the frequency cannot be made which are required to obtain the high deviations that are desirable to put more energy in the side bands of an FSK spectrum.

It is thus an object of this invention to provide method and apparatus for FSK modulation which achieves a desired high stability for the 0 and 1 frequencies while avoiding the problems set forth above.

In accordance with the present invention, method and apparatus is provided for the FSK modulation of digital data using two separate oscillators. One oscillator is at the 1 frequency and the other is at the 0 frequency. FSK modulation is accomplished by switching between the two frequencies based on the state of the digital data. Phase and frequency shifting techniques are also provided to insure that a desired difference between the 1 frequency and 0 frequency is maintained and to also insure that a proper phase relationship is maintained between the output from the two oscillators so as to insure that a transition occurs as illustrated for the top wave form of FIG. 1 and not as illustrated for the bottom wave for FIG. 1.

Other objects and advantages of the invention will be apparent from the foregoing brief description of the invention and the claims as well as the detailed description of FIGS. 2-4.

All of the drawings are briefly described as follows.

The invention is described in terms of particular circuitry for FSK modulation. The invention is, however, applicable to different circuits which accomplish the functions required by the present invention.

Figure 2:
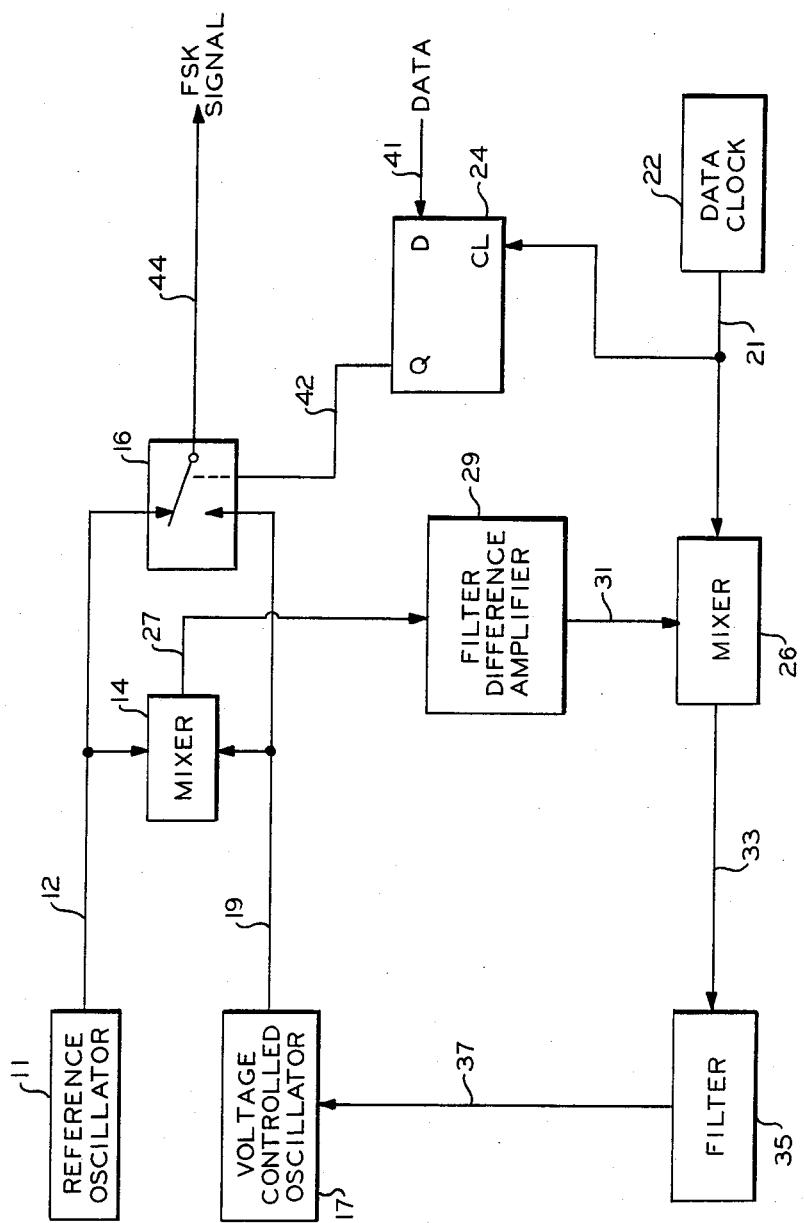
FIG. 2 is a diagrammatic illustration of the FSK modulation circuitry of the present invention.

Referring now to FIG. 2, there is illustrated a reference oscillator 11 which, for the sake of illustration, provides the 1 or mark frequency as the output signal 12. The reference oscillator 11 is a high stability, temperature compensated oscillator based on a crystal. Signal 12 is provided from the reference oscillator 11 as an input to the mixer 14 and also as an input to the switch 16.

The voltage controlled oscillator 17 provides the output signal 19 which has the 0 or space frequency. The voltage controlled oscillator is a phase locked oscillator. Signal 19 is provided as an input to the mixer 14 and also as an input to the switch 16.

For the particular communications system to which the present invention was applied, the 1 or mark frequency was 15.002656 MHz. The 0 space frequency was 14.997344 MHz. This provided a difference frequency of 5.3125 KHz which is the data rate (the frequency at which the digital data could change states). 5.3125 KHz is thus the frequency of the output signal 21 from the data clock 22 which will be described more fully hereinafter.

The output signal 21 from the data clock 22 is utilized to clock the data by being applied to the clock input of the flip flop 24. Signal 21 is also supplied as an input to the mixer 26.

The output signal 27 from the mixer 14 will have a high frequency component and a low frequency component. The high frequency component will have a frequency which is the sum of the frequency of signals 12 and 19. The low frequency component will have a frequency which is the difference between the frequency of signals 12 and 19.

If the output signal 19 from the voltage control oscillator 17 has the proper frequency, the low frequency component of signal 27 will have a frequency of 5.3125 KHz. Signal 27 is provided from the mixer 14 as an input to the filter/difference amplifier 29.

The high frequency component of signal 27 is filtered by the filter/difference amplifier 29 and the low frequency component is amplified. The amplified low frequency component of signal 27 is provided as signal 31 to the mixer 26. The output signal 33 from the mixer 26 will, as was the case with signal 27, have a high frequency and low frequency component. Again, the high frequency component will have a frequency equal to the sum of the frequency of signals 21 and 31. The low frequency component will have a frequency equal to the difference. Signal 33 is provided from the mixer 26 as an input to the filter 35.

The high frequency component of signal 33 is filtered by the filter 35 and the low frequency component is provided as signal 37 to the frequency control input of the voltage controlled oscillator 17. Digital data is provided as signal 41 to the D input of the flip flop 24. The Q output of the flip-flop 24 is provided as signal 42 to the control input of the switch 16. The output from the switch 16 is the FSK modulated signal 44.

It is noted that an "imageless" mixer could be used for mixer 14 and mixer 26 if desired. Such a mixer outputs only the desired frequency component such as the low frequency or difference frequency in the present invention. Thus, the filters 29 and 35 would not be required if an imageless mixer was used. However, the use of an imageless mixer is not preferred because such mixers are much more expensive than more conventional mixers which output both a sum and difference frequency.

In operation, the low frequency component of signal 33 will be a DC voltage (zero frequency) signal if the difference frequency component of signal 27 and the data clock signal 21 are in phase. However, when the difference frequency component of signal 27 is out of phase with the data clock 21, the low frequency component of signal 33, which is applied as signal 37 to the voltage control oscillator 17, will have a frequency. This will cause a change in the frequency of output signal 19 from the voltage controlled oscillator such that a desired phase relationship between the difference frequency component of signal 27 and the data clock signal 21 is obtained.

Figure 1:
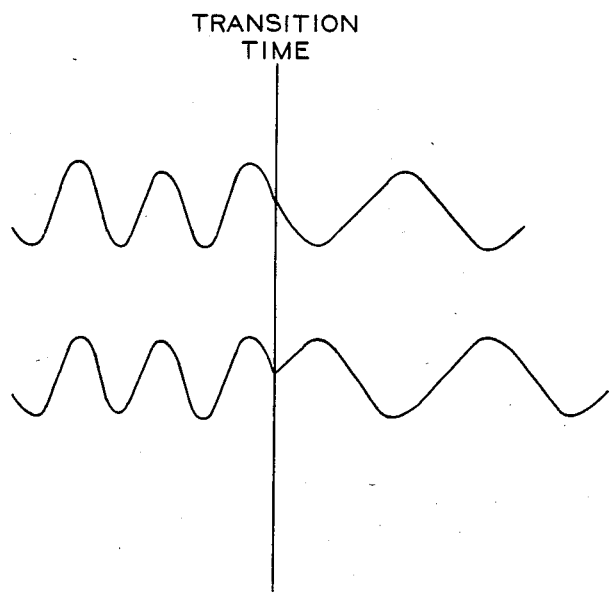
FIG. 1 is an illustration of a desired and undesired transition for FSK modulation.

The switch 16 is switched each time the digital data 41 makes a state transition. Digital data supplied to the switch 16 is synchronous with the data clock 21 because the flip-flop 24 is clocked by the data clock. The desired transition illustrated in the upper part of FIG. 1 is achieved because the difference frequency component of signal 27 is in phase with the data clock 21. Thus, circuitry is provided for FSK modulation where a high deviation (2 for the frequencies described) is obtained and a phase relationship is maintained to provide a desired transition when the digital data changes state.

Figure 3:
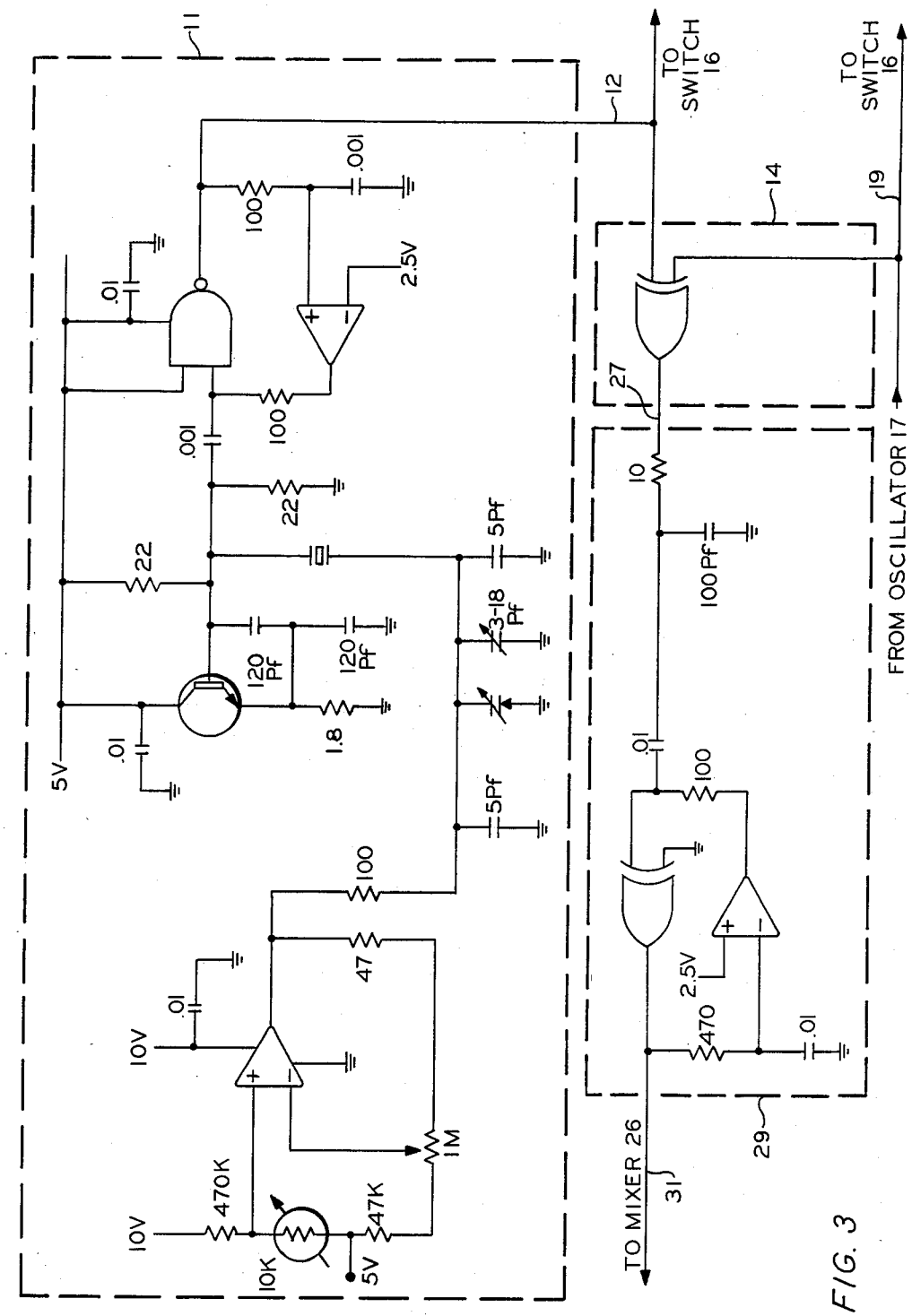
FIGS. 3 and 4 are a schematic of the circuitry illustrated in FIG. 2.
Figure 4:
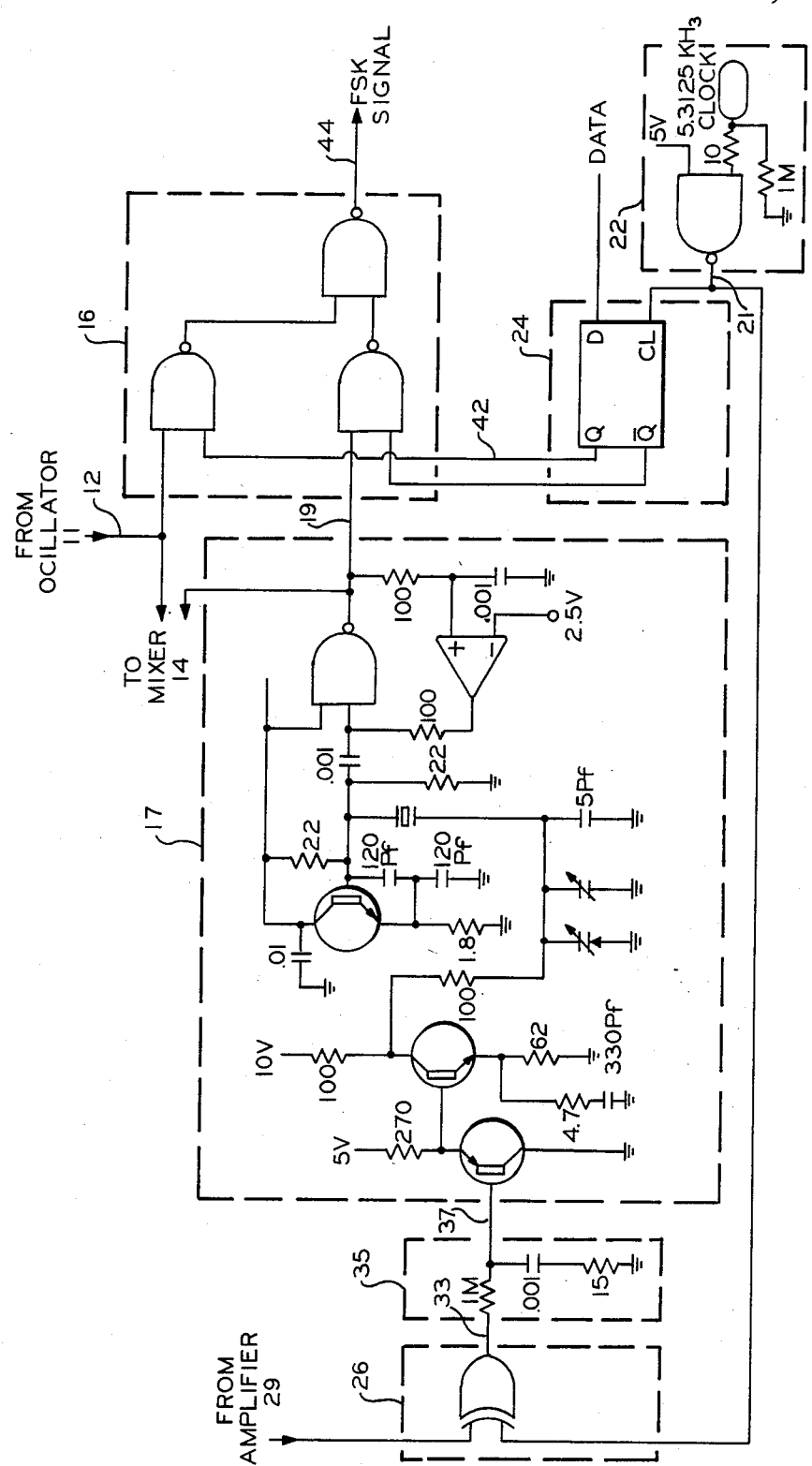

Circuitry which may be utilized to implement the functions illustrated in FIG. 2 is illustrated in FIGS. 3 and 4. Reference oscillator 11, mixer 14 and filter/difference amplifier 29 are illustrated in FIG. 3. The remaining circuitry is illustrated in FIG. 4.

The circuit is preferably implemented utilizing HC-CMOS chips. These chips may be obtained from a number of manufacturers such as RCA, Motorola, Fairchild and National. Also, the operational amplifiers may be obtained from a number of manufacturers. The function of each of the chips is fully described by literature supplied by the manufacturers of these chips and the manner in which the circuit operates would be obvious to one skilled in the art of electronics.

Particular remarks regarding the circuitry illustrated in FIG. 3 is as follows:

1. As designed, the reference oscillator 11 has a ±0.005% stability for the temperature range of −40° C. to +65° C.
2. Amplification is utilized as required to bring the level of the signals up to HC-CMOS logic levels.
3. An EXCLUSIVE OR gate (74HC86) is utilized as a mixer.

Particular components used in the circuitry illustrated in FIG. 3, which are not labeled in FIG. 3, are as follows:
Thermistor: 10K
Voltage Variable Capacitor Diodes: MV2105, 2107
NAND Gates: 74HC00
EXCLUSIVE OR Gates: 74HC86
Crystal for Oscillator 11: HC18/u 15.002656 MHz
Crystal for Oscillator 17: HC18/u 14.997344 MHz
Transistor in Oscillator 11: MPSH10
Transistors in Oscillator 17: (Left to Right): MPS6523, MPS6521, MPSH10
All Operational Amplifiers TLO62IP
Flip Flop 24 4013

All capacitance values are in micro farads unless otherwise designated. All resistance values are in KΩ unless otherwise stated. All voltages are positive.

The invention has been illustrated and described in terms of a preferred embodiment as illustrated in FIGS. 1–4. As has been previously discussed, reasonable variations and modifications are possible. Such variations and modifications are within the scope of the disclosure and the appended claims to the invention.

That which is claimed is:
1. Apparatus comprising:
a reference oscillator, wherein said reference oscillator provides a first signal having a first frequency;
a voltage controlled oscillator, wherein said voltage controlled oscillator provides a second signal having a second frequency which is different from said first frequency;
means for switching between said first signal and said second signal to establish a FSK modulated signal;
means for controlling said means for switching in response to the state of a digital data signal and in response to a data clock;
means for establishing a difference signal which has a frequency equal to the difference between the frequency of said first signal and the frequency of said second signal; and
means for controlling said voltage controlled oscillator so that said difference signal is in phase with said data clock.

2. Apparatus in accordance with claim 1 wherein said means for controlling said means for switching comprises:
a flip-flop having a data input, a clock input, and Q output;
means for providing said digital data signal to the data input of said flip-flop;
means for providing said data clock to the clock input of said flip-flop, wherein the state of said data input is transferred to said Q output each time said data clock makes a transition to a positive state; and
means for supplying the Q output from said flip-flop as a control signal to said means for switching, wherein said means for switching is controlled in such a manner that said FSK modulated signal has said first frequency when said digital data signal is in a first state and has said second frequency when said digital data signal is in a second state.

3. Apparatus in accordance with claim 1 wherein said means for establishing said difference signal comprises:
a first mixer;
means for providing said first signal as an input to said first mixer;
means for providing said second signal as an input to said first mixer, wherein said first mixer establishes a third signal having a high frequency component which has a frequency equal to the sum of said first frequency and said second frequency and has a low frequency component which has a frequency equal to the difference between said first frequency and said second frequency;
a first low pass filter; and
means for passing said third signal through said first low pass filter to remove said high frequency component and establish said difference signal.

4. Apparatus in accordance with claim 3 wherein said means for controlling said voltage controlled oscillator comprises:
a second mixer;
means for supplying said difference signal as a first input to said second mixer;
means for providing said data clock as a second input to said second mixer, wherein said second mixer establishes a fourth signal which has a high frequency component having a frequency equal to the sum of the frequency of said difference signal and the frequency of said data clock and has a low frequency component having a frequency equal to the difference between the frequency of said difference signal and said data clock;
a second low pass filter;
means for passing said fourth signal through said second low pass filter to remove the high frequency component from said fourth signal and to establish a control signal for said voltage controlled oscillator, wherein said control signal is a signal having a zero frequency only if said difference signal is in phase with said data clock; and means for providing said control signal to the control input of said voltage controlled oscillator, wherein the frequency of said second signal is varied in response to said control signal so as to maintain said difference signal in phase with said data clock and wherein the frequency of said second signal is varied only if said control signal does not have a zero frequency.

5. A method for converting a digital data signal into an FSK modulated signal, said method comprising the steps of:

switching between a first signal having a first frequency and a second signal having a second frequency, which is different from said first frequency, in response to the state of said digital data signal and in response to a data clock to establish said FSK modulated signal, wherein said first signal is established by a reference oscillator and said second signal is established by a voltage controlled oscillator;

establishing a difference signal which has a frequency equal to the difference between the frequency of said first signal and the frequency of said second signal; and controlling said voltage controlled oscillator so that said difference signal is in phase with said data clock.

6. A method in accordance with claim 5 wherein said step of switching between said first signal and said second signal comprises:

providing said digital data signal to the data input of a flip-flop;

providing said data clock to the clock input of said flip-flop, wherein the state of said data input is transferred to the Q output of said flip-flop each time said data clock makes a transition to a positive state; and switching between said first signal and said second signal in response to the Q output from said flip-flop in such a manner that said FSK modulated signal has said first frequency when said digital data signal is in a first state and has said second frequency when said digital data signal is in a second state.

7. A method in accordance with claim 5 wherein said step of establishing said difference signal comprises:

mixing said first signal and said second signal to establish a third signal having a high frequency component which has a frequency equal to the sum of said first frequency and said second frequency and has a low frequency component which has a frequency equal to the difference between said first frequency and said second frequency; and filtering the high frequency component from said third signal to establish said difference signal.

8. A method in accordance with claim 7 wherein said step of controlling said voltage controlled oscillator comprises:

mixing said difference signal and said data clock to establish a fourth signal which has a high frequency component having a frequency equal to the sum of the frequency of said difference signal and the frequency of said data clock and has a low frequency component having a frequency equal to the difference between the frequency of said difference signal and said data clock;

filtering the high frequency component of said fourth signal to establish a control signal for said voltage controlled oscillator, wherein said control signal has a zero frequency only if said difference signal is in phase with said data clock;

controlling said voltage controlled oscillator in response to said control signal in such a manner that the frequency of said second signal is varied in response to said second signal so as to maintain said difference signal in phase with said data clock, wherein the frequency of said second signal is varied only if said control signal does not have a zero frequency.

* * * * *